United States Patent
Hester, Jr.

[11] 3,886,174
[45] *May 27, 1975

[54] 1-SUBSTITUTED-6-PHENYL-4H-S-TRIAZOLO[4,3-A][1,4]BENZODIAZEPINES

[75] Inventor: Jackson B. Hester, Jr., Galesburg, Mich.

[73] Assignee: The Upjohn Company, Kalamazoo, Mich.

[ * ] Notice: The portion of the term of this patent subsequent to Aug. 1, 1989, has been disclaimed.

[22] Filed: Jan. 15, 1973

[21] Appl. No.: 323,453

Related U.S. Application Data

[63] Continuation-in-part of Ser. No. 201,207, Nov. 22, 1971, abandoned, which is a continuation-in-part of Ser. No. 138,278, April 28, 1971, abandoned.

[52] U.S. Cl.......... 260/308 R; 71/92; 260/239.3 D; 260/287 R; 424/269
[51] Int. Cl............................................ C07d 57/02
[58] Field of Search ................................ 260/308 R

[56] References Cited
UNITED STATES PATENTS

| | | | |
|---|---|---|---|
| 3,681,343 | 8/1972 | Hester | 260/308 R |
| 3,734,922 | 5/1973 | Hester | 260/308 R |

FOREIGN PATENTS OR APPLICATIONS

| | | | |
|---|---|---|---|
| 2,220,612 | 11/1972 | Germany | 260/308 R |
| 2,220,615 | 11/1972 | Germany | 260/308 R |
| 7,205,705 | 10/1972 | Netherlands | 260/208 R |
| 2,220,716 | 11/1972 | Germany | 260/308 R |
| 6,916,543 | 5/1970 | Netherlands | 260/308 R |

Primary Examiner—Alton D. Rollins
Attorney, Agent, or Firm—Hans L. Berneis

[57] ABSTRACT

6-Phenyl-4H-s-triazolo[4,3-a][1,4]benzodiazepines of the formula (III):

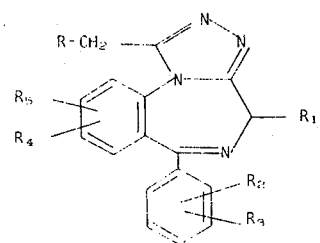

wherein R is selected from the group consisting of cyano, nitro, alkylthio in which the alkyl groups are of 1 to 3 carbon atoms, inclusive, and —COOR" in which R" is an alkyl group defined as above; wherein $R_1$ is selected from the group consisting of hydrogen and alkyl, defined as above, and wherein $R_2$, $R_3$, $R_4$, and $R_5$ are selected from the group consisting of hydrogen, alkyl defined as above, halogen, nitro, cyano, trifluoromethyl, and alkoxy, alkylthio, alkylsulfinyl, alkylsulfonyl, and alkanoylamino, in which the carbon chain moieties are of 1 to 3 carbon atoms, inclusive, and dialkylamino in which alkyl is defined as above, are produced by condensing a 1,3-dihydro-5-phenyl-2H-1,4-benzodiazepine-2-thione of the formula (I):

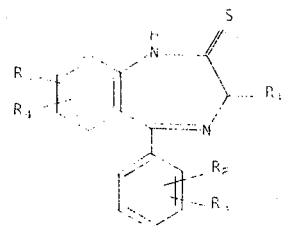

wherein $R_1$, $R_2$, $R_3$, $R_4$, and $R_5$ are defined as above, with an organic acid hydrazide of the formula (II):

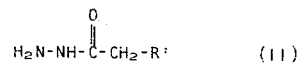

wherein R' is selected from the groups consisting of cyano, nitro, and alkylthio in which the alkyl groups are defined as above, or by hydrolyzing a compound in which R' is —CN, with an alcohol, water and hydrogen chloride to obtain a product III wherein R is —COOR", and R" is alkyl, defined as above.

The new products of formula III including their pharmacologically acceptable acid addition salts are useful as sedatives, tranquilizers and muscle relaxants in mammals and birds.

12 Claims, No Drawings

1-SUBSTITUTED-6-PHENYL-4H-S-TRIAZOLO[4,3-A][1,4]BENZODIAZEPINES

CROSS REFERENCE TO RELATED APPLICATIONS

This application is a continuation-in-part of application Ser. No. 201,207 filed Nov. 22, 1971, and now abandoned, which is a continuation-in-part of application Ser. No. 138,278, filed Apr. 28, 1971, and now abandoned.

BACKGROUND OF THE INVENTION

FIELD OF THE INVENTION

This invention is directed to new organic compounds and is particularly concerned with novel 1-substituted 6-phenyl-4H-s-triazolo[4,3-a][1,4]benzodiazepines and a process for the production thereof.

The novel compounds and the process of production therefor can be illustratively represented as follows:

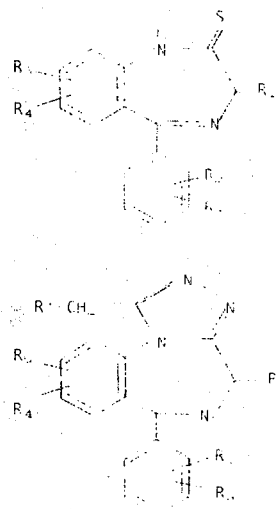

wherein R' is selected from the group consisting of cyano, nitro, alkylthio in which alkyl is of 1 to 3 carbon atoms, inclusive; wherein $R_1$ is selected from the group consisting of hydrogen and alkyl defined, as above, and wherein $R_2$, $R_3$, $R_4$, and $R_5$ are selected from the group consisting of hydrogen, alkyl as defined above, halogen, nitro, cyano, trifluoromethyl, and alkoxy, alkylthio, alkylsulfinyl, alkylsulfonyl, alkanoylamino in which the carbon chain moieties are of 1 to 3 carbon atoms, inclusive and dialkylamino in which alkyl is defined as above. Compound IIIa (wherein R' is —CN) by hydrolysis produces compound III with R=—COOR" in which R" is alkyl defined as above.

The compounds of formula III are therefore 1-substituted 6-phenyl-4H-s-triazolo[4,3-a][1,4]benzodiazepines:

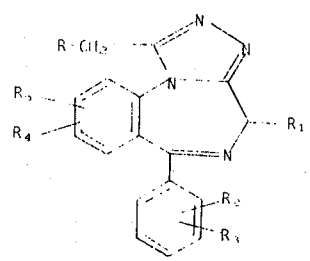

wherein $R_1$, $R_2$, $R_3$, $R_4$, and $R_5$ have the significance of above and R has the value of R' and —COOR" wherein R" is defined as above.

The more preferred species of this invention have the formula

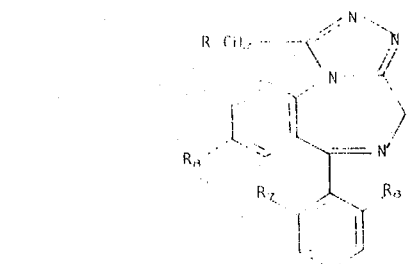

wherein R is selected from the group consisting of cyano, nitro,

in which R" is alkyl of 1 to 3 carbon atoms, inclusive, and alkylthio in which alkyl is as defined above; wherein $R_6$ and $R_7$ are selected from the group consisting of hydrogen, fluorine, chlorine, bromine, and nitro, and wherein $R_8$ is selected from the group consisting of hydrogen, fluorine, chlorine, bromine, nitro, cyano, trifluoromethyl, and alkylthio, in which alkyl is defined as above.

Still more preferred are those compounds which have the formula:

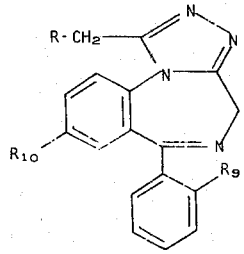

wherein R is selected from the group consisting of cyano, nitro,

in which R" is alkyl of 1 to 3 carbon atoms, inclusive, and alkylthio in which alkyl is defined as above; and wherein $R_9$ and $R_{10}$ are selected from the group consisting of hydrogen and chlorine.

The invention includes also the pharmacologically acceptable acid addition salts of III.

The process of this invention comprises: condensing a 1,3-dihydro-5-phenyl-2H-1,4-benzodiazepine-2-thione of formula 1 in an organic solvent, e.g., a lower-alkanol of 1 to 4 carbon atoms, inclusive, or cyclohexanol with an acid hydrazide II, at a temperature between 60° and 120° C. to give the corresponding 1-substituted 6-phenyl-4H-s-triazolo[4,3-a][1,4]benzodiazepine (IIIa) The compounds of formula IIIa wherein R' is cyano, can be hydrolyzed to convert this group to a group defined as above, thereby providing a compound of formula III in which R is —COOR", defined as I DE-

SCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkoxy, alkylthio, alkylsulfinyl, alkylsulfonyl, dialkylamino which is of 1 to 3 carbon atoms, inclusive, is defined as lower-alkyl of 1 to 3 carbon atoms, inclusive, as above.

The alkanoylamino group of 1 to 3 carbon atoms consists of formamido acetamido and propionamido.

The term halogen includes fluorine, chlorine, and bromine.

The novel compounds of the formula III (IV and V, inclusive) including acid addition salts thereof have sedative, tranquilizing and muscle relaxant effects in mammals and birds.

The acid addition salts of compounds of formula III (IV and V) contemplated in this invention, are the hydrochlorides, hydrobromides, hydriodides, sulfates, phosphates, cyclohexanesulfamates, methanesulfonates and the like, prepared by reacting a compound of formula III with an excess of the selected pharmacologically acceptable acid.

Sedative effects of 8-chloro-6-phenyl-4H-s-triazolo-[4,3-a][1,4]benzodiazepine-1-acetonitrile are shown by the following tests in mice:

Chimney test: [Med. Exp. 4 145 (1971)]: The effective intraperitoneal dosage for 50 percent of the mice tested ($ED_{50}$) is 0.3 mg./kg. The test determines the ability of mice to back up and out of a vertical glass cylinder within 30 seconds. At the effective dosage, 50 percent of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50 percent of the mice remain in the dish. The $ED_{50}$ (intraperitoneal administration) in this test was 0.30 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 0.7 mg./kg.

Nicotine antagonsim test: Mice in a group of 6 are injected with the test compound 8-chloro-6-phenyl-4H-s-triazolo[4,3-a][1,4]benzodiazepine-1-acetonitrile. Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 0.13 mg./kg. of the test compound protected 50 percent of the mice against (2) and for (3) 0.15 mg./kg. ($ED_{50}$) was necessary.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstrach, stearic acid, methylcellulose, and the like may be used as carriers or for coating purposes. Water or oil, e.g., coconut oil, sesame oil, safflower oil, cottonseed oil, peanut oil may be used for preparing solutions or suspensions of the active drug. Sweetening, coloring and flavoring agents may be added.

For mammals and birds, food premixes, with starch, oatmeal, dried fishmeat, fishmeal flour, and the like can be prepared.

As tranquilizers, the compounds of formula III can be used in dosages of 0.1 mg. to 10 mg./kg. in oral or injectable preparations as described above, to alleviate tension and anxiety in mammals or birds, such as e.g., occurs when animals are shipped.

Other acid addition salts of the compounds of formula III can be made, such as the fluosilicic acid adition salts which are useful mothproofing compounds or the trichloroacetates useful as herbicides against Johnson grass, Bermuda grass, yellow and green foxtail and quack grass.

The starting materials of formula I of this invention, substituted or unsubstituted 1,3-dihydro-5-phenyl-2H-1,4-benzodiazepine-2-thiones, are described by G. A. Archer and L. H. Sternbach [J. Org. Chem. 29, 231 (1964) and U.S. Pat. No. 3,422,091]. These compounds (I) are made by the reaction of the known substituted or unsubstituted 1,3-dihydro-5-phenyl-2H-1,4-benzodiazepin-2-ones by heating with phosphorus pentasulfide in pyridine for about 45 minutes (Archer et al., ibid.). The following compounds of formula I are representative starting materials:

1,3-dihydro-5-phenyl-2H-1,4-benzodiazepine-2-thione;
6-chloro-1,3-dihydro-5-(m-bromophenyl)-2H-1,4-benzodiazepine-2-thione;
7-chloro-1,3-dihydro-5-phenyl-2H-1,4-benzodiazepine-2-thione;
8-chloro-1,3-dihydro-5-phenyl-2H-1,4-benzodiazepine-2-thione;
7-bromo-1,3-dihydro-5-phenyl-2H-1,4-benzodiazepine-2-thione;
7-chloro-1,3-dihydro-5-(3,4-dimethylphenyl)-2H-1,4-benzodiazepine-2-thione;
1,3-dihydro-5-(2-methyl-4-methoxyphenyl)-2H-1,4-benzodiazepine-2-thione;
9-bromo-1,3-dihydro-5-phenyl-2H-1,4-benzodiazepine-2-thione;
7-methyl-1,3-dihydro-5-phenyl-2H-1,4-benzodiazepine-2-thione;
7-nitro-1,3-dihydro-5-phenyl-2H-1,4-benzodiazepine-2-thione;
8-nitro-1,3-dihydro-5-(o-chlorophenyl)-2H-1,4-benzodiazepine-2-thione;
7-bromo-1,3-dihydro-5-(o-bromophenyl)-2H-1,4-benzodiazepine-2-thione;
7-methylsulfinyl-1,3-dihydro-5-(o-fluorophenyl)-2H-1,4-benzodiazepine-2-thione;
7-methyl-1,3-dihydro-5-(p-chlorophenyl)-2H-1,4-benzodiazepine-2-thione;
7-methylthio-1,3-dihydro-5-phenyl-2H-1,4-benzodiazepine-2-thione;
7-cyano-1,3-dihydro-5-(o-chlorophenyl)-2H-1,4-benzodiazepine-2-thione;
3,6,8-trimethyl-1,3-dihydro-5-(m-chlorophenyl)-2H-1,4-benzodiazepine-2-thione;

9-propylsulfonyl-7-methyl-1,3-dihydro-5-phenyl-2H-1,4-benzodiazepine-2-thione;

7-trifluoromethyl-1,3-dihydro-5-(o-chlorophenyl)-2H-1,4-benzodiazepine-2-thione;

7-dimethylamino-1,3-dihydro-5-phenyl-2H-1,4-benzodiazepine-2-thione;

7-fluoro-1,3-dihydro-5-(o-chlorophenyl)-2H-1,4-benzodiazepine-2-thione;

7,8-dicyano-1,3-dihydro-5-[p-(methylsulfonyl)phenyl]-2H-1,4-benzodiazepine-2-thione;

6,9-dichloro-1,3-dihydro-5-(p-isopropylphenyl)-2H-1,4-benzodiazepine-2-thione;

6,8-diethyl-1,3-dihydro-5-(m-ethylphenyl)-2H-1,4-benzodiazepine-2-thione;

6-nitro-1,3-dihydro-5-(o-propylthiophenyl)-2H-1,4-benzodiazepine-2-thione;

7,9-bix(dipropylamino)-1,3-dihydro-5-(o-nitrophenyl)-2H-1,4-benzodiazepine-2-thione;

9-acetylamino-1,3-dihydro-5-(p-cyanophenyl)-2H-1,4-benzodiazepine-2-thione;

and the like.

In carrying out the process of the invention, a selected 1,3-dihydro-5-phenyl-2H-1,4-benzodiazepine-2-thione (I) in an inert organic solvent, preferably in a lower-alkanol, e.g., 1-butanol, 2-butanol, hexanol, or the like is heated to between 60°–120° C., preferably to the reflux temperature of the mixture, with the selected acid hydrazide

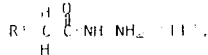

defined as above, during 2-48 hours. In the preferred embodiment of this invention the acid hydrazide is used in excess such as from 2 to 5 times the theoretically required amount, but the reaction is operative with smaller or larger amounts. The reaction period is between 2 and 18 hours. At the termination of the reaction, the reaction mixture can be evaporated to give a crude product consisting of the desired 6-phenyl-4H-s-triazolo[4,3-a][1,4]benzodiazepine IIIa. The crude compound IIIa is then purified by standard methods, e.g. chromatography or recrystallization from solvents such as ethyl acetate, methylene chloride, chloroform, acetonitrile, methanol, ethanol, Skellysolve B hexanes; mixtures thereof, or the like.

6-Phenyl-4H-s-triazolo[4,3-a][1,4]benzodiazepine-1-acetonitriles (compounds of formula IIIa in which R' is —C≡N) can be hydrolyzed in a lower alkanol e.g. methanol, ethanol, propanol, or 2-propanol in the presence of anhydrous hydrogen chloride. During the adding of hydrogen chloride cooling is necessary as the reaction is preferably carried out at 0°–30° C. Ethyl ether may be used as a diluent in the reaction. After the reaction is terminated, the reaction mixture is mixed with water, neutralized, e.g. with sodium or potassium bicarbonate, and the product recovered by conventional methods e.g. extraction and evaporation, chromatography, recrystallization, or a combination thereof and the like.

The following examples are illlustrative of the processes and products of the present invention, but are not to be construed as limiting.

EXAMPLE 1

8-Chloro-6-phenyl-4H-s-triazolo[4,3-a][1,4]benzodiazepine-1-acetonitrile

A mixture of 1,3-dihydro-7-chloro-5-phenyl-2H-1,4-benzodiazepine-2-thione (5.72 g., 0.02 mole), cyanoacetic acid hydrazide (5.95 g., 0.06 mole) and n-butyl alcohol (275 ml.) was refluxed for 7.5 hours with a slow stream of nitrogen bubbling through the mixture. The mixture was then concentrated in vacuo. The resulting residue was suspended in water and extracted with methylene chloride. The extract was dried and concentrated. The residue was chromatographed on silica gel (400 g.) with 2% methanol- 98% chloroform. The product eluted from the column was crystallized from ethyl acetate-Skellysolve B hexanes to give 2.62 g. of 8-chloro-6-phenyl-4H-s-triazolo[4,3-a]-[1,4]benzodiazepine-1-acetonitrile of melting point 198°–201° C.

Anal. calcd. for $C_{18}H_{12}Cl\ N_5$:
C, 64.77; H, 3.63; Cl, 10.62; N, 20.98.
Found: C, 64.52; H, 3.86; Cl, 10.51; N, 20.95.

EXAMPLE 2

8-Chloro-6-phenyl-4H-s-triazolo[4,3-a][1,4]-benzodiazepine-1-acetic acid methyl ester A stirred mixture of 8-chloro-6-phenyl-4H-s-triazolo-[4,3-a][1,4]benzodiazepine-1-acetonitrile (1.00 g., 0.003 mole), methanol (2 ml.) and ether (6 ml.) was cooled in a salt-ice bath and saturated with a stream of anhydrous hydrogen chloride during 15 minutes. The mixture was allowed to warm slowly to ambient temperature and stand for 18 hours; it was then poured into water. This mixture was neutralized with sodium bicarbonate and extracted with chloroform. The extract was washed with brine, dried over anhydrous magnesium sulfate and then concentrated. The residue was crystallized from methanol to give 0.149 g. of a by-product of melting point 184.5°–188° C. (d). The mother liquor was crystallized from methanol-ethyl acetate to give 0.126 g. of a by-product, 1-(aminomethyl)-7-chloro-5-phenyl-s-triazolo[4,3-a]quinoline-4-carboxylic acid methyl ester, of melting point 205.5°–207.5° C. (d). The mother liquor from this crystallization was concentrated and chromatographed on silica gel (50 g.) with 2% methanol-98% chloroform. The first compound eluted from the column was crystallized from methanol-ethyl acetate to give 0.169 g. of melting point 202.5°–203.5° C. (d.) and 0.125 g. of melting point 200.5°–202.5° C. (d.) of 8-chloro-6-phenyl-4H-s-triazolo[4,3-a][1,4]benzodiazepine-1-acetic acid methyl ester. The analytical sample had a melting point of 202°–203° C.

Anal. calcd. for $C_{19}H_{15}ClN_4O_2$:
C, 62.21; H, 4.12; Cl, 9.67; N, 15.28.
Found: C, 62.32; H, 4.14; Cl, 10.15; N, 15.33.

EXAMPLE 3

8-Chloro-6-(o-chlorophenyl)-4H-s-triazolo-[4,3-a][1,4]benzodiazepine-1-acetonitrile In the manner given in Example 1, 1,3-dihydro-7-chloro-5-(o-chlorophenyl)-2H-1,4-benzodiazepine-2-thione, and cyanoacetic acid hydrazide were refluxed in n-butanol to give 8-chloro-6-(o-chlorophenyl)-4H-s-triazolo[4,3-a]-[1,4]benzodiazepine-1-acetonitrile.

EXAMPLE 4

8-nitro-6-phenyl-4H-s-triazolo[4,3-a][1,4]benzodiazepine-1-acetonitrile

In the manner given in Example 1, a solution of 1,3-dihydro-7-nitro-5-phenyl-2H-1,4-benzodiazepine-2- thione and cyanoacetic acid hydrazide were reacted to give 8-nitro-6-phenyl-4H-s-triazolo[4,3-a][1,4]benzodiazepine-1-acetonitrile.

EXAMPLE 5

8-Fluoro-6-(2,6-difluorophenyl)-4H-s-triazolo-[4,3-a][1,4]benzodiazepine-1-acetonitrile In the manner given in Example 1, a solution of 1,3-dihydro-7-fluoro-5-(2,6-difluorophenyl)-2H-1,4-benzodiazepine-2-thione in n-butyl alcohol was heated to reflux with cyanoacetic acid hydrazide to give 8-fluoro-6-(2,6-difluorophenyl)-4H-s-triazolo[4,3-a][1,4]benzodiazepine-1-acetonitrile.

EXAMPLE 6

8-Ethylthio-6-(o-chlorophenyl)-4H-s-triazolo-[4,3-a][1,4]benzodiazepine-1-acetonitrile In the manner given in Example 1, a solution of 1,3-dihydro-7-ethylthio-5-(o-chlorophenyl)-2H-1,4-benzodiazepine-2-thione in n-butyl alcohol was heated to reflux with cyanoacetic acid hydrazide to give 8-ethylthio-6-(o-chlorophenyl)-4H-s-triazolo[4,3-a][1,4]benzodiazepin-1-acetonitrile.

EXAMPLE 7

7-Fluoro-6-(o-bromophenyl)-4H-s-triazolo-[4,3-a][1,4]benzodiazepine-1-acetonitrile In the manner given in Example 1, a solution of 1,3-dihydro-6-fluoro-5-(o-bromophenyl)-2H-1,4-benzodiazepine-2-thione in n-butyl alcohol was heated to reflux with cyanoacetic acid hydrazide to give 7-fluoro-6-(o-bromophenyl)-4H-s-triazolo[4,3-a][1,4]benzodiazepine-1-acetonitrile.

EXAMPLE 8

7-Trifluoromethyl-6-(p-nitrophenyl)-4H-s-triazolo[4,3-a][1,4]benzodiazepine-1-acetonitrile In the manner given in Example 1, a solution of 1,3-dihydro-6-trifluoromethyl-5-(p-nitrophenyl)-2H-1,4-benzodiazepine-2-thione in n-butyl alcohol was heated to reflux with cyanoacetic acid hydrazide to give 7-trifluoromethyl-6-(p-nitrophenyl)-4H-s-triazolo[4,3-a][1,4]benzodiazepine-1-acetonitrile.

EXAMPLE 9

8-nitro-1-(nitromethyl)-6-(o-chlorophenyl)-4H-s-triazolo[4,3-a][1,4]benzodiazepine In the manner given in Example 1, a solution of 1,3-dihydro-7-nitro-5-(o-chlorophenyl)-2H-1,4-benzodiazepine-2-thione in n-butyl alcohol was heated to reflux with nitroacetic acid hydrazide to give 8-nitro-1-(nitromethyl)-6-(o-chlorophenyl)-4H-s-triazolo[4,3-a][1,4]benzodiazepine.

EXAMPLE 10

7-Ethylsulfinyl-1-(nitromethyl)-6-[p-(trifluoromethyl)phenyl]-4H-s-triazolo[4,3-a][1,4]benzodiazepine In the manner given in Example 1, a solution of 1,3-dihydro-6-ethylsulfinyl-5-[p-(trifluoromethyl)phenyl]-2H-1,4-benzodiazepine-2-thione in n-butyl alcohol was heated to reflux with nitroacetic acid hydrazide to give 7-ethylsulfinyl-1-(nitromethyl)-6-[p-(trifluoromethyl)phenyl]-4H-s-triazolo[4,3-a][1,4]benzodiazepine.

EXAMPLE 11

9-Methyl-1-(nitromethyl)-6-(p-isopropylphenyl)-4H-s-triazolo[4,3-a][1,4]benzodiazepine In the manner given in Example 1, a solution of 1,3-dihydro-8-methyl-5-(p-isopropylphenyl)-2H-1,4-benzodiazepine-2-thione in n-butyl alcohol was heated to reflux with nitroacetic acid hydrazide to give 9-methyl-1-(nitromethyl)-6-(p-isopropylphenyl)-4H-s-triazolo[4,3-a][1,4-benzodiazepine.

EXAMPLE 12

7,9-Diethyl-1-(nitromethyl)-6-(2,4-diethylphenyl)-4H-s-triazolo[4,3-a][1,4]benzodiazepine In the manner given in Example 1, a solution of 1,3-dihydro-6,8-diethyl-5-(2,4-diethylphenyl)-2H-1,4-benzodiazepine-2-thione in n-butyl alcohol was heated to reflux with nitroacetic acid hydrazide to give 7,9-diethyl-1-nitromethyl-6-(2,4-diethylphenyl)-4H-s-triazolo[4,3-a]-[1,4]benzodiazepine.

EXAMPLE 13

8-Chloro-1-(nitromethyl)-6-phenyl-4H-s-triazolo[4,3-a][1,4]benzodiazepine

In the manner given in Example 1, 1,3-dihydro-7-chloro-5-phenyl-2H-1,4-benzodiazepine-2-thione and nitroacetic acid hydrazide were refluxed in n-butanol to give 8-chloro--nitromethyl)-(nitromethyl)16-phenyl-4H-s-triazolo[4,3-a][1,4]-benzodiazepine.

EXAMPLE 14

8-Chloro-4-methyl-1-(nitromethyl)-6-(p-isopropylphenyl)-4H-s-triazolo[4,3-a][1,4]benzodiazepine In the manner given in Example 1, 7-chloro-1,3-dihydro-3-methyl-5-(p-isopropylphenyl)-2H-1,4-benzodiazepine-2-thione and nitroacetic acid hydrazide were refluxed in n-butanol to give 8-chloro-4-methyl-1-(nitromethyl)-6-(p-isopropylphenyl)-4H-s-triazolo[4,3-a][1,4]benzodiazepine.

EXAMPLE 15

8-Chloro-1-(nitromethyl)-6-(2,6-difluorophenyl)-4H-s-triazolo[4,3-a][1,4]benzodiazepine.

In the manner given in Example 1, 1,3-dihydro-7-chloro-5-(2,6-difluorophenyl)-2H-1,4-benzodiazepin-2-thione and nitroacetic acid hydrazide were refluxed in n-butanol to give 8-chloro-1-(nitromethyl)-6-(2,6-difluorophenyl)-4H-s-triazolo[4,3-a][1,4]benzodiazepine.

EXAMPLE 16

7,8-Dinitro-6-(2,4-dibromophenyl)-4H-s-triazolo[4,3-a][1,4]benzodiazepine-1-acetonitrile In the manner given in Example 1, a solution of 1,3-dihydro-6,7-dintiro-5-(2,4-dibromophenyl)-2H-1,4-benzodiazepine-2-thione in n-butyl alcohol was heated to reflux with cyanoacetic acid hydrazide to give 7,8- dinitro-6-(2,4-dibromophenyl)-4H-s-triazolo[4,3-a][1,4]benzodiazepine-1-acetonitrile.

EXAMPLE 17

7-Trifluoromethyl-6-[m-(methylsulfonyl)phenyl]-4H-s-triazolo[4,3-a][1,4]benzodiazepine-1-acetic acid ethyl ester In the manner given in Example 2, 7-trifluoromethyl-6-[m-(methylsulfonyl)phenyl]-4H-s-triazolo[4,3-a][1,4]benzodiazepin-1-acetonitrile was hydrolyzed in ethanol with anhydrous hydrogen chloride to give 7-trifluoromethyl-6-[m-(methylsulfonyl)phenyl]-4H-s-triazolo[4,3-a][1,4]benzodiazepine-1-acetic acid ethyl ester.

EXAMPLE 18

7,9-Diethyl-6-(2,4-diethylphenyl)-4H-s-triazolo[4,3-a][1,4]benzodiazepine-1-acetic acid propyl ester In the manner given in Example 2, 7,9-diethyl-6-(2,4-diethylphenyl)-4H-s-triazolo[4,3-a][1,4]benzodiazepine-1-acetonitrile was hydrolyzed in 1-propanol with anhydrous hydrogen chloride to give 7,9-diethyl-6-(2,4-diethylphenyl)-4H-s-triazolo[4,3-a][1,4]benzodiazepine-1-acetic acid propyl ester.

EXAMPLE 19

7,8-Dinitro-6-(2,4-dibromophenyl)-4H-s-triazolo[4,3-a][1,4]benzodiazepine-1-acetic acid methyl ester In the manner given in Example 2, 7,8-dinitro-6-(2,4-dibromophenyl)-4H-s-triazolo[4,3-a][1,4]benzodiazepine-1-acetonitrile was hydrolyzed in methanol with anhydrous hydrogen chloride to give 7,8-dinitro-6-(2,4-dibromophenyl)-4H-s-triazolo[4,3-a][1,4]benzodiazepine-1-acetic acid methyl ester.

EXAMPLE 20

8-Chloro-6-(o-chlorophenyl)-4H-s-triazolo-[4,3-a][1,4]benzodiazepine-1-acetic acid ethyl ester In the manner given in Example 2, 8-chloro-6-(o-chlorophenyl)-4H-s-triazolo[4,3-a][1,4]benzodiazepine-1-acetonitrile in ethanol-ether was treated under cooling with anhydrous hydrogen chloride to give 8-chloro-6-(o-chlorophenyl)-4H-s-triazolo[4,3-a][1,4]benzodiazepine-1-acetic acid ethyl ester.

EXAMPLE 21

7-Trifluoromethyl-6-(p-nitrophenyl)-4H-s-triazolo[4,3-a][1,4]benzodiazepine-1-acetic acid ethyl ester In the manner given in Example 2, 7-trifluoromethyl-6-(p-nitrophenyl)-4H-s-triazolo[4,3-a][1,4]benzodiazepine-1-acetonitrile in ethanol-ether was treated under cooling with anhydrous hydrogen chloride to give 7-trifluoromethyl-6-(p-nitrophenyl)-4H-s-triazolo[4,3-a][1,4]benzodiazepine-1-acetic acid ethyl ester.

EXAMPLE 22

8-Fluoro-6-(2,6-difluorophenyl)-4H-s-triazolo-[4,3-a][1,4]benzodiazepine-1-acetic acid methyl ester In the manner given in Example 2, 8-fluoro-6-(2,6-difluorophenyl)-4H-s-triazolo[4,3-a][1,4]benzodiazepine-1-acetonitrile in methanol-ether was treated under cooling with anhydrous hydrogen chloride to give 8-fluoro-6-(2,6-difluorophenyl)-4H-s-triazolo[4,3-a][1,4]benzodiazepine-1-acetic acid methyl ester.

EXAMPLE 23

8-Ethylthio-6-(o-chlorophenyl)-4H-s-triazolo-[4,3-a][1,4]benzodiazepine-1-acetic acid propyl ester In the manner given in Example 2, 8-ethylthio-6-(o-chlorophenyl)-4H-s-triazolo[4,3-a][1,4]benzodiazepine-1-acetonitrile in propanol-ether was treated under cooling with anhydrous hydrogen chloride to give 8-ethylthio-6-(o-chlorophenyl)-4H-s-triazolo[4,3a][1,4]benzodiazepine-1-acetic acid propyl ester.

EXAMPLE 24

8-Chloro-1-[(methylthio)methyl]-6-(o-chlorophenyl)-4H-s-triazolo[4,3-a][1,4]benzodiazepine In the manner given in Example 1, a solution of 1,3-dihydro-7-chloro-5-(o-chlorophenyl)-2H-1,4-benzodiazepine-2-thione in n-butyl alcohol was heated to reflux with (methylthio)acetic acid hydrazide to give 8-chloro-1-[(methylthio)methyl]-6-(o-chlorophenyl)-4H-s-triazolo-[4,3-a][1,4]benzodiazepine.

EXAMPLE 25

9-Nitro-1-[(ethylthio)methyl]-6-[m-(propylsulfonyl)phenyl]-4H-s-triazolo[4,3-a][1,4]benzodiazepine In the manner given in Example 1, a solution of 1,3-dihydro-8-nitro-5-[m-(propylsulfonyl)phenyl]-2H-1,4-benzodiazepine-2-thione in n-butyl alcohol is heated to reflux with (ethylthio) acetic acid hydrazide to give 9-nitro-1-[(ethylthio)methyl]-6-[m-(propylsulfonyl)phenyl]-4H-s-triazolo[4,3-a][1,4]benzodiazepine.

EXAMPLE 26

8-Chloro-1-[(propylthio)methyl]-6-phenyl-4H-s-triazolo[4,3-a][1,4]benzodiazepine In the manner given in Example 1, 1,3-dihydro-7-chloro-5-phenyl-2H-1,4-benzodiazepine-2-thione in n-butyl alcohol was heated to reflux with (propylthio)acetic acid hydrazide to give 8-chloro-1-[(propylthio)methyl]-6-phenyl-4H-s-triazolo[4,3-a][1,4]benzodiazepine.

EXAMPLE 27

8-nitro-4-methyl-1-[(isopropylthio)methyl]-6-(m-acetamidophenyl)-4H-s-triazolo[4,3-a][1,4]benzodiazepine In the manner given in Example 1, 3-methyl-1,3-dihydro-7-nitro-5-(m-acetamidophenyl)-2H-1,4-benzodiazepine-2-thione in n-butyl alcohol was heated to reflux with (isopropylthio)acetic acid hydrazide to give 8-nitro-4-methyl-1-[(isopropylthio)methyl]-6-(m-acetamidophenyl)-4H-s-triazolo[4,3-a][1,4]benzodiazepine.

EXAMPLE 28

9-(Dimethylamino)-1-[(methylthio)methyl]-6-(2,4-dibromophenyl)-4H-s-triazolo[4,3-a][1,4]benzodiazepine In the manner given in Example 1, 1,3-dihydro-8-(dimethylamino)-5-(2,4-dibromophenyl)-2H-1,4-benzodiazepine-2-thione in n-butyl alcohol was heated to reflux with (methylthio)acetic acid hydrazide to give 9-(dimethylamino)-1-[(methylthio)methyl]-6-(2,4-dibromophenyl)-4H-s-triazolo-[4,3-a][1,4]benzodiazepine.

EXAMPLE 29

1-[(Methylthio)methyl]-6-(o-chlorophenyl)-4H-s-triazolo[4,3-a][1,4]benzodiazepine In the manner given in Example 1, 1,3-dihydro-5-(o-chlorophenyl)-2H-1,4-benzodiazepine-2-thione in n-butyl alcohol was heated to reflux with (methylthio)acetic aicd hydrazide to give 1-[(methylthio)methyl]-6-(o-chlorophenyl)-4H-s-triazolo[4,3-a][1,4]benzodiazepine.

EXAMPLE 30

7,8-dicyano-1-[(methylthio)methyl]-6-(2,4-dibromophenyl)-4H-s-triazolo[4,3-a][1,4]benzodiazepine In the manner given in Example 1, 1,3-dihydro-6,7-dicyano-5-(2,4-dibromophenyl)-2H-1,4-benzodiazepine-2-thione in n-butyl alcohol was heated to reflux with (methylthio)acetic acid hydrazide to give 7,8-dicyano-1-[(methylthio)methyl]-6-(2,4-dibromophenyl)-4H-s-triazolo-[4,3-a][1,4]benzodiazepine.

EXAMPLE 31

6-(o-chlorophenyl)-4H-s-triazolo[4,3-a][1,4]-benzodiazepine-1-acetonitrile

In the manner given in Example 1, a solution of 1,3-dihydro-5-(o-chlorophenyl)-2H-1,4-benzodiazepine-2-thione in n-butyl alcohol was heated to reflux with cyano-acetic acid hydrazide to give 6-(o-chlorophenyl)-4H-s-triazolo-[4,3-a][1,4]benzodiazepine-1-acetonitrile.

EXAMPLE 32

8-Chloro-1-[(methylthio)methyl]-6-phenyl-4H-s-triazolo[4,3-a][1,4]benzodiazepine In the manner given in Example 1, a solution of 1,3-dihydro-7-chloro-5-phenyl-2H-1,4-benzodiazepine-2-thione in n-butyl alcohol is heated to reflux with (methylthio)acetic acid hydrazide to give 8-chloro-1-[(methylthio)-methyl]-6-phenyl-4H-s-triazolo[4,3-a][1,4]benzodiazepine.

EXAMPLE 33

8-Chloro-1-(nitromethyl)-6-(o-chlorophenyl)-4H-s-triazolo[4,3-a][1,4]benzodiazepine In the manner given in Example 1, a mixture of 1,3-dihydro-7-chloro-5-(o-chlorophenyl)-2H-1,4-benzodiazepine-2-thione and nitroacetic acid hydrazide was refluxed in n-butanol to give 8-chloro-1-(nitromethyl)-6-(o-chlorophenyl)-4H-s-triazolo[4,3-a][1,4]benzodiazepine.

Pharmacologically acceptable acid addition salts are obtained from compounds of formula III (including IV and V) by adding from 1 to 3 equivalents of a pharmacologically acceptable acid to a molar equivalent of the selected diazepine III (IV or V). Preferably such addition may be made in a water-free medium e.g. ether, ethanol, or the like wherein the salt either precipitates or is readily collected by evaporation of the solvent. The hydrochlorides, hydrobromides, sulfates, phosphates, acetates, tartrates, citrates, sulfamates, and the like are of particular interest in preparing pharmaceutical dosage forms.

In the manner given in the preceding examples, other 1,3-dihydro-5-phenyl-2H-1,4-benzodiazepine-2-thiones of formula I can be condensed with acid hydrazides II, as defined earlier, to give other new 1-substituted 6-phenyl-4H-s-triazolo[4,3-a][1,4]benzodiazepines III. Representative compounds, thus obtained, include:

10-chloro-1-[(methylthio)methyl]-6-(m-isopropylphenyl)-4H-s-triazolo[4,3-a][1,4]benzodiazepine;
7-(propylthio)-6-(m-trifluoromethylphenyl)-4H-s-triazolo-[4,3-a][1,4]benzodiazepine-1-acetonitrile;
8-(propionylamino)-6-(2,4-dibromophenyl)-4H-s-triazolo-[4,3-a][1,4]benzodiazepine-1-acetonitrile;
4-propyl-1-(nitromethyl)-6-(o-fluorophenyl)-4H-s-triazolo-[4,3-a][1,4]benzodiazepine;
4-ethyl-1-[(methylthio)methyl]-6-[o-(ethylthio)phenyl]-4H-s-triazolo[4,3-a][1,4]benzodiazepine;
4-methyl-7,10-dichloro-1-[(ethylthio)methyl]-6-(m-isopropoxyphenyl)-4H-s-triazolo[4,3-a][1,4]benzodiazepine;
9-(dipropylamino)-1-[(propylthio)methyl]-6-[m-(propylthio)phenyl]-4H-s-triazolo[4,3-a][1,4]benzodiazepine;
7-(diisopropylamino)-1-(nitromethyl)-6-[p-(dipropylamino)-phenyl]-4H-s-triazolo[4,3-a][1,4]benzodiazepine;
4-isopropyl-7,9-difluoro-6-phenyl-4H-s-triazolo[4,3-a]-[1,4]benzodiazepine-1-acetic acid ethyl ester;
8-chloro-6-(3,4-dimethylphenyl)-4H-s-triazolo[4,3-a][1,4]-benzodiazepine-1-acetic acid propyl ester;
6-(2-methyl-4-methoxyphenyl)-4H-s-triazolo[4,3-a][1,4]-benzodiazepine-1-acetonitrile;
8-chloro-6-(o-chlorophenyl)-4H-s-triazolo[4,3-a][1,4]benzodiazepine-1-acetic acid methyl ester;
6-(o-chlorophenyl)-4H-s-triazolo[4,3-a][1,4]benzodiazepin-1-acetic acid methyl ester;
6-phenyl-4H-s-triazolo[4,3-a][1,4]benzodiazepine-1-acetic acid methyl ester;
8-chloro-6-phenyl-4H-s-triazolo[4,3-a][1,4]benzodiazepin-1-acetic acid ethyl ester;
6-(o-chlorophenyl)-4H-s-triazolo[4,3-a][1,4]benzodiazepin-1-acetic acid ethyl ester;
6-phenyl-4H-s-triazolo[4,3-a][1,4]benzodiazepin-1-acetic acid ethyl ester;
8-fluoro-6-(o-chlorophenyl)-1-(nitromethyl)-4H-s-triazolo-[4,3-a][1,4]benzodiazepine;
6-(o-chlorophenyl)-1-(nitromethyl)-4H-s-triazolo[4,3-a]-[1,4]benzodiazepine,
6-phenyl-1-(nitromethyl)-4H-s-triazolo[4,3-a][1,4]benzodiazepine;
8-Nitro-1-[(methylthio)methyl]-6-phenyl-4H-s-triazolo-[4,3-a][1,4]benzodiazepine;
1-[(methylthio)methyl]-6-phenyl-4H-s-triazolo[4,3-a][1,4]-benzodiazepine;
8-(trifluoromethyl)-1-[(methylthio)methyl]-6-phenyl-4H-s-triazolo[4,3-a][1,4]benzodiazepine;
8-(methylthio)-1-[(methylthio)methyl]-6-phenyl-4H-s-triazolo[4,3-a][1,4]benzodiazepine;
8-(methylthio)-1-(nitromethyl)-6-phenyl-4H-s-triazolo-[4,3-a][1,4]benzodiazepine;

6-phenyl-4H-s-triazolo[4,3-a][1,4]benzodiazepine-1-acetonitrile;
8-nitro-6-phenyl-4H-s-triazolo[4,3-a][1,4]benzodiazepine-1-acetic acid methyl ester;

and the like.

I claim:
1. A 1-substituted 6-phenyl-4H-s-triazolo[4,3-a][1,4]-benzodiazepine of the formula (III):

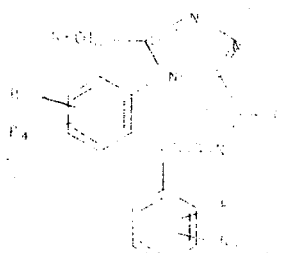

wherein R is selected from the group consisting of cyano, nitro, alkylthio in which the alkyl moiety is of 1 to 3 carbon atoms, inclusive, and —COOR'' in which R'' is alkyl defined as above; wherein $R_1$ is selected from the group consisting of hydrogen and alkyl, defined as above; and wherein $R_2$, $R_3$, $R_4$, and $R_5$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino in which the carbon chain moieties are of 1 to 3 carbon atoms, inclusive, and dialkylamino in which alkyl is defined as above, and the pharmacologically acceptable acid addition salts thereof.

2. A compound according to claim 1 of the formula IV:

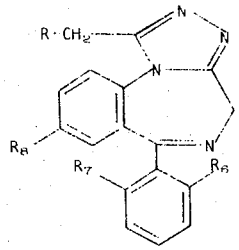

wherein R is selected from the group consisting of cyano, nitro,

in which R'' is alkyl of 1 to 3 carbon atoms, inclusive, and alkylthio in which alkyl is as defined above; wherein $R_6$ and $R_7$ are selected from the group consisting of hydrogen, fluorine, chlorine, bromine, and nitro; and wherein $R_8$ is selected from the group consisting of hydrogen, fluorine, chlorine, bromine, nitro, cyano, trifluoromethyl, and alkylthio in which alkyl is defined as above, and the pharmacologically acceptable acid addition salts thereof.

3. A compound according to claim 1 of the formula V

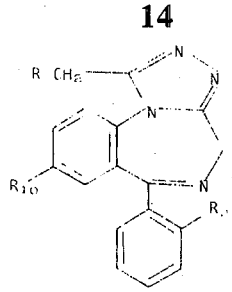

wherein R is selected from the group consisting of cyano, nitro,

in which R'' is alkyl of 1 to 3 carbon atoms, inclusive and alkylthio in which alkyl is as defined above; and wherein $R_9$ and $R_{10}$ are selected from the group consisting of hydrogen and chlorine.

4. The compound according to claim 1, wherein R is

in which R'' is alkyl of 1 to 3 carbon atoms, inclusive.

5. The compound of claim 3, wherein R is —COOCH$_3$ $R_9$ is hydrogen and $R_{10}$ is chloro and the compound is therefore 8-chloro-6-phenyl-4H-s-triazolo[4,3-a][1,4]benzodiazepine-1-acetic acid methyl ester.

6. A compound according to claim 3, wherein R is —COOC$_2$H$_5$, $R_9$ and $R_{10}$ are chloro, and the compound is 8-chloro-6-(o-chlorophenyl)-4H-s-triazolo[4,3-a][1,4]-benzodiazepin-1-acetic acid ethyl ester.

7. The compound of claim 3, wherein R is —CN, $R_9$ is hydrogen and $R_{10}$ is chloro, and the compound is therefore 8-chloro-6-phenyl-4H-s-triazolo[4,3-a][1,4]benzodiazepine-1-acetonitrile.

8. A compound according to claim 3, wherein R is CN, $R_9$ and $R_{10}$ are chloro and the compound is therefore 8-chloro-6-(o-chlorophenyl)-4H-s-triazolo[4,3-a][1,4]benzodiazepin-1-acetonitrile.

9. A compound according to claim 3 wherein R is methylthio, $R_9$ is hydrogen, $R_{10}$ is chloro and the compound is therefore 8-chloro-1-[(methylthio)methyl]-6-phenyl-4H-s-triazolo[4,3-a][1,4]benzodiazepine.

10. A compound according to claim 3 wherein R is methylthio, $R_9$ and $R_{10}$ are chloro and the compound is therefore 8-chloro-1-[(methylthio)methyl]-6-(o-chlorophenyl)-4H-s-triazolo[4,3-a][1,4]benzodiazepine.

11. A compound according to claim 3 wherein R is nitro, $R_9$ is hydrogen, $R_{10}$ is chloro and the compound is therefore 8-chloro-1-(nitromethyl)-6-phenyl-4H-s-triazolo-[4,3-a][1,4]benzodiazepine.

12. A compound according to claim 3 wherein R is nitro, $R_9$ and $R_{10}$ are chloro and the compound is therefore 8-chloro-1-(nitromethyl)-6-(o-chlorophenyl)-4H-s-triazolo[4,3-a][1,4]benzodiazepine.

* * * * *